United States Patent [19]
Ketels

[11] Patent Number: 5,085,613
[45] Date of Patent: Feb. 4, 1992

[54] APPARATUS FOR GAINING SINGLE ORGANS FROM THE BELLY CAVITY OF FISH

[75] Inventor: Dieter Ketels, Kühsen, Fed. Rep. of Germany

[73] Assignee: Nordischer Maschinenbau Rud. Baader GmbH & Co. KG, Lubeck, Fed. Rep. of Germany

[21] Appl. No.: 657,837

[22] Filed: Feb. 20, 1991

[30] Foreign Application Priority Data

Feb. 26, 1990 [DE] Fed. Rep. of Germany ....... 4006046

[51] Int. Cl.$^5$ .............................................. A23B 4/03
[52] U.S. Cl. .................................... 452/110; 452/106; 452/116
[58] Field of Search ................ 452/110, 106, 120, 116

[56] References Cited
U.S. PATENT DOCUMENTS 3,707,019 12/1972 Wiggins .............................. 452/110
3,793,676 2/1974 Wiggins .............................. 452/110
4,956,894 9/1990 Matsubayashi ..................... 452/110

Primary Examiner—Bruce M. Kisliuk
Assistant Examiner—Lawrence Cruz
Attorney, Agent, or Firm—Fay, Sharpe, Beall, Fagan, Minnich & McKee

[57] ABSTRACT

Single organs, such as the hard-roe sacks or soft-roe are removed from fish by placing decapitated fish in a coneyor having troughs that are advanced transversely to the longitudinal axis of the fish. The fish are conveyed with their belly leading and lying on their side. The fish are fixed by engagement in the region of their tail end portion. The gaining of the organs occurs by controlled movement of one pressing element, each, into the trough, so that the pressing element compresses the belly cavity progressively from the belly side starting at the tail-side end of the belly cavity and progressing toward the decapitation end of the fish.

18 Claims, 2 Drawing Sheets

APPARATUS FOR GAINING SINGLE ORGANS FROM THE BELLY CAVITY OF FISH

BACKGROUND OF THE INVENTION

1. Field of the Invention

The invention relates to the processing of decapitated fish with particular regard to the gaining of organs, especially the gonads present in the belly cavity of such fish. Conventionally, such processing is performed by apparatus comprising a conveyor including throughs provided with supporting webs receiving the fish lying on their sides between said supporting webs and conveying them in a direction transverse to their longitudinal axis; at least one pressing element, which is controlled to move into the path of conveyance along said fish and between the supporting webs for carrying out a progressive local massaging effect on the belly area from the tail end side of the belly cavity towards the decapitation end; and means for retaining the fish by engaging their tail area.

2. Prior Art

Various apparatuses of the this type are known in the prior art. E.g., an apparatus is disclosed by U.S. Pat. No. 3,793,676 in which the decapitated fish are conveyed lying on their side transverse to their longitudinal axis and are treated by pressing or pulling elements accompanying their movement, which elements engage the flank of the fish, compress the belly cavity in a continuous action extending from the region of the tail end side of the belly cavity and continuing towards the head end. By this action the gonads and other organs are massaged towards the decapitation end and are pressed out of the latter. The pressing elements are designed as roller bodies which are formed as pneumatic rollers and/or can be mounted to be displaceable against spring force. According to other modifications, the roller bodies are provided with different profiles, the purpose of which is an adaptation to the anatomy of the fish.

This apparatus causes high expenditure and must, moreover, be modified for each fish species and each fish size, which is complicated and uneconomical.

Furthermore, there is disclosed an apparatus in Japanese Patent 59-227 237 showing a modified embodiment in which decapitated fish are arranged to lie side by side on their back in troughs and are conveyed transversely to their longitudinal axis. The squeezing out of the gonads or other organs occurs by a massaging ledge arranged obliquely relative to the conveying direction of the troughs, which ledge comes into operative engagement with the belly of each fish and presses out the said intestinal portions towards the decapitation end. It is obvious that this apparatus can only be used for fish of essentially the same size.

As an optional concept within the scope of this Japanese prior art the fish bodies to be freed of the gonads are seized, with the tail leading, by their back area between conveying belts and the belly cavity lying free is massaged by means of a pressing roller.

Apart from the fact that the output to be achieved is unsatisfactory due to the conveying in the longitudinal extension of the fish, it is only possible to realize the combining of such procedural steps with a decapitating treatment at high expenditure.

OBJECTS OF THE INVENTION

It is the main object of the present invention to suggest an improved apparatus for obtaining the gonads from fish particularly by reducing the expenditure necessary in various ones of the prior art devices.

It is a further essential object of the invention to suggest an apparatus which makes it possible to treat fish accurately for the purpose of gonad gaining in a wide range of sizes without having to modify the apparatus.

It is yet a further important object of the invention to enable a relatively simple manner of integrating such a device into a conventional fish processing machine.

SUMMARY OF THE INVENTION

An apparatus according to one embodiment of the invention has a conveyor including troughs provided with supporting webs receiving the fish lying on their sides between said supporting webs to convey them in a direction transverse to their longitudinal axis included is at least one pressing element, which is controlled to move into the path of conveyance along said fish and between the supporting webs for carrying out a progressive local massaging effect on the belly area from the tail end side of the belly cavity towards the decapitation end. The fish are retained by engaging their tail area. At least one pressing element engages the fish from the bottom side of its belly; moves, at least while engaging said fish, along a plane which is essentially parallel to the bottom of the trough and slightly spaced from said bottom; and is arranged to be resiliently displaceable in the direction of the advancing of the troughs. In such an apparatus, the pressing elements form part of a rotational body driven to rotate about an axis essentially perpendicular to the plane of the bottom of the troughs, and the speed of rotation of said rotational body is synchronized with the advance motion of the troughs.

With such apparatus, it is possible to achieve a resulting course between the path of the pressing bodies and the motion of the troughs, which essentially follows the backbone-sided boundary of the belly cavity of a number of fish species in a wide range independent of the respective fish size. It is possible to adapt the course to the specific requirements by providing an arrangement in which the axis of the rotational body is adjustable in the direction of the longitudinal axis of the troughs.

In order to be able to adapt the course of each pressing element to the specific circumstances required, the pressing elements may preferably be mounted on the free end of a carrier arm, which is mounted pivotably on the pressing element about a pivot axis which is perpendicular to the plane of the rotational body. The carrier arm is mounted in a manner to be displaced against the force of a spring on a smaller radius of rotation. In order to safeguard an unimpeded return movement of the pressing elements into their basic operative position at the start of their operation, the pressing elements may advantageously be arranged to be moved under control at least along part of their revolution with the rotational body out of a position perpendicular to the plane of rotation of the rotational body. Furthermore, the at least one pressing element may be designed as a roller body.

BRIEF DESCRIPTION OF THE DRAWINGS

Other and further objects of the present invention will be apparent from the following description and claims and from what is illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings

DETAILED DESCRIPTION OF THE DRAWINGS

Figure 1:
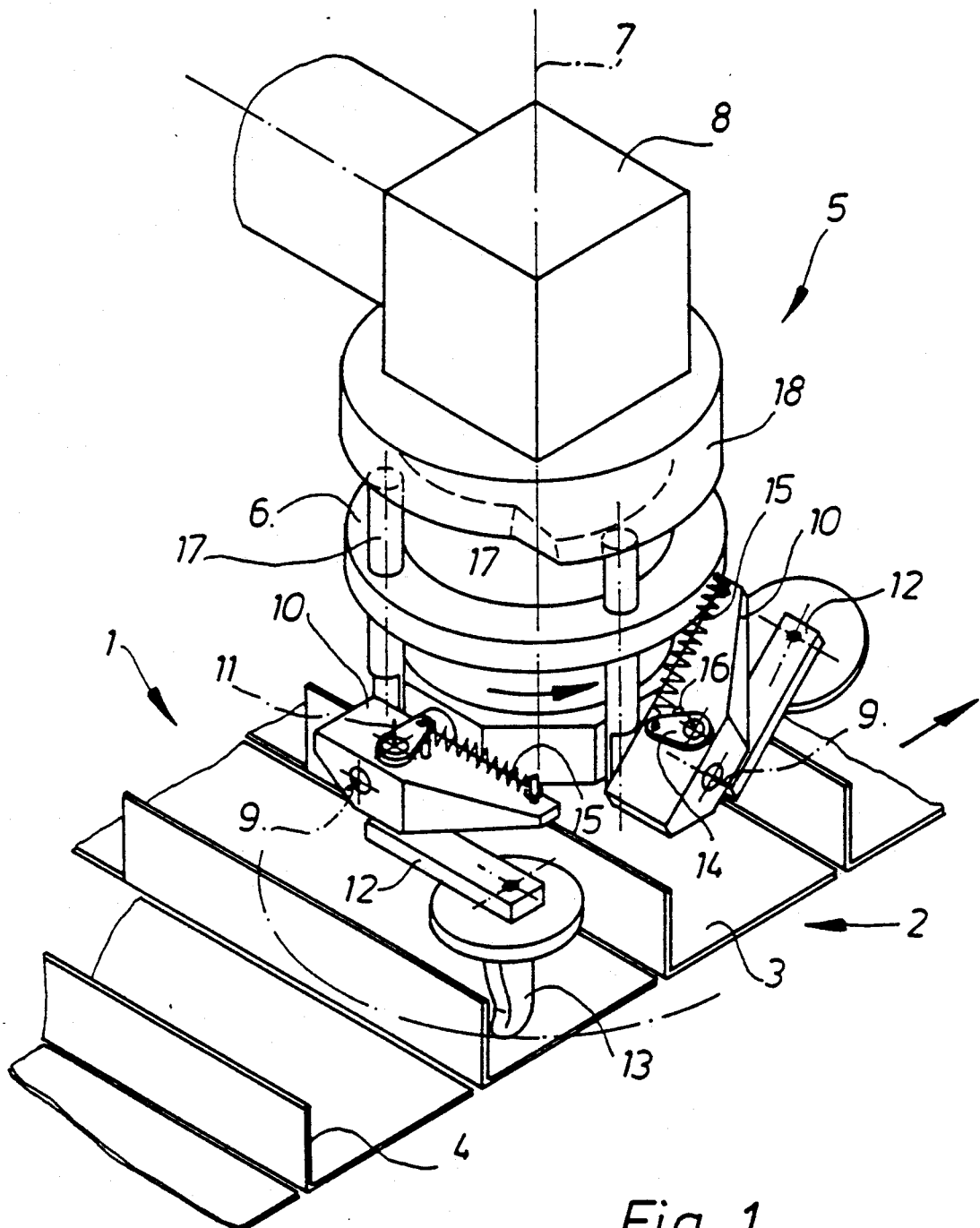
FIG. 1 shows a general view in axonometric representation of the apparatus in association with a trough conveyor for receiving fish.

Mounted in a not-shown frame, preferably a decapitating machine for fish, is a conveyor 1 in the form of a chain comprising troughs 2 arranged side by side, which is driven in an appropriate manner such that the troughs 2 are continuously advanced transversely to their longitudinal axis. In profile, the troughs 2 essentially have the shape of an angle, one leg of which constituting the bottom 3 and the other leg of which constituting a supporting web 4 which projects essentially perpendicularly and is arranged on the trailing side of the trough 2.

A tool unit 5 is fixed on the frame and located above the path of the troughs 2. Said tool unit comprises a rotational body 6, which is driven to rotate about an axis 7 essentially perpendicular to the plane of the bottom 3 of the troughs 2. The speed of rotation of said rotational body is synchronized with the advance motion of the troughs 2. The rotational body 6 is attached to the output axle of an angular gear 8 which simultaneously serves as the holder or mounting for the tool unit 5. Fastened on the part of the rotational body 6 facing towards the troughs 2, are four radial pivots or spindles 9, which project therefrom and are arranged at 90° pitch to each other. Mounted on each of these, respectively, is a bearing body 10, which is consequently pivotable in a plane parallel to the driving axle of the angular gear 8. Each bearing body 10 is provided with a cross hole in which a pivot axle 11 of a carrier arm 12 is mounted, said carrier arm being movable as a crank. Mounted on the free ends of each of the carrier arms 12 is a pressing element or body 13 facing the bottom 3 of the troughs 2, which body widens in a discoid manner at its upper end. By means of a tension spring 15, the carrier arm 12 is held against a stop 16 by a crank 14, mounted to the pivot axle 11, said spring engaging said crank and holding the carrier arm 12 positioned approximately tangentially to the rotational body 6. Each bearing body 10 is engaged by a control rod 17 which forms a lever to the pivot 9, said rod being guided by the rotational body 6 and being supported by means of a frame-fixed axial cam 18. The engagement of the control rods 17 on the axial cam 18 is provided for by not-shown tension springs.

Figure 2:
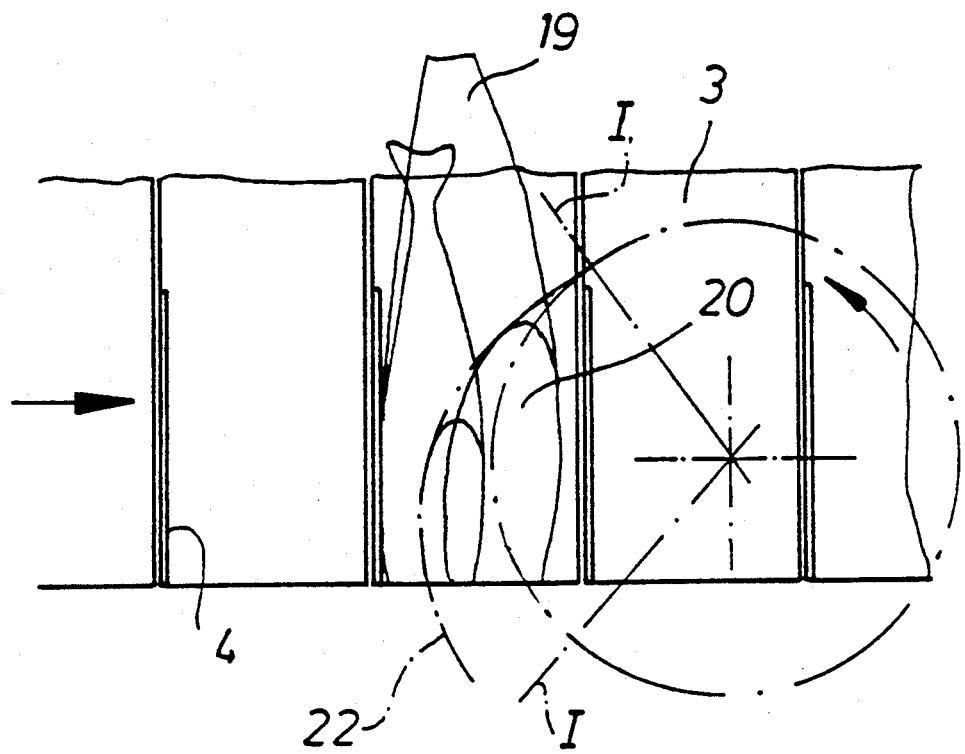
FIG. 2 shows a plan view of the apparatus, represented by a section with a representation of the relative movement of the pressing body in relation to the advancing troughs.
Figure 3:
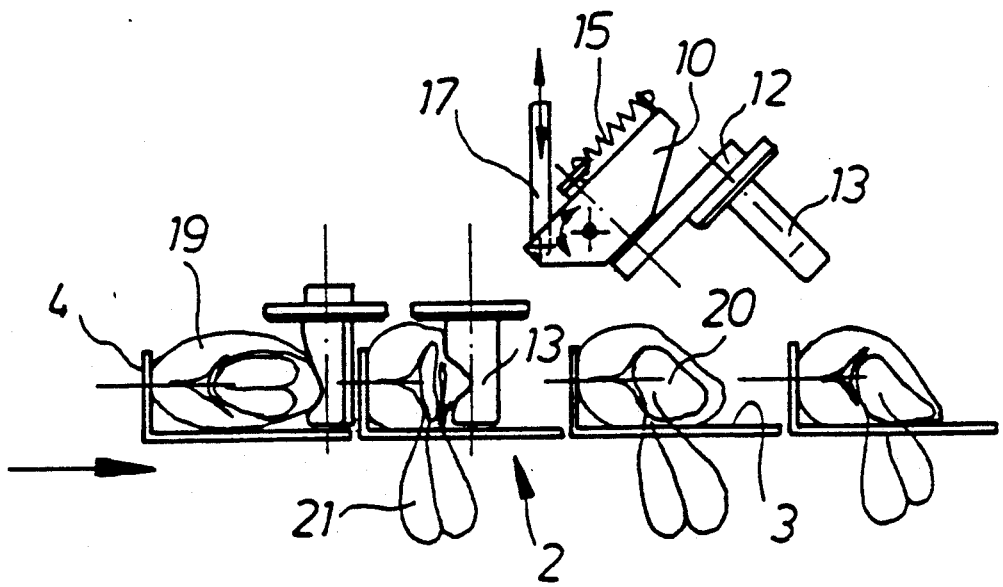
FIG. 3 shows a detailed sideview with momental representations of individual functional phases of the pressing element.

The apparatus functions as follows:

Following previous decapitation, the fish to be processed are advanced against the tool unit 5, said fish lying on the bottom 3 and with their backs leaning against the supporting web 4, respectively. At the latest, shortly before entry into the working area of said tool unit 5, the fish are fixed in the tail area by means of a not-shown holding conveyor accompanying the fish. Next, the fish 19 to be processed comes into contact with one of the pressing bodies 13, which has been brought into its working position for this purpose. This working position is maintained approximately during the passage of the pressing body 13 through Sector I—I of the revolution of the rotational body 6, as shown in FIG. 2, and effects that the corresponding pressing body 13 comes into contact with the fish 19 at the bottom side of its belly in the region of the tail-side end of the belly cavity 20. During the passage of the pressing body 13 through Sector I—I, as a result of the path of revolution of said pressing body, the belly cavity 20 of the fish 19 is progressively pressed together, starting from the end of the belly cavity 20 and moving toward the decapitation end, as is shown in FIG. 3 in single phases. During this process, in particular, the gonads, i.e. the (hard) roe sack 21 or the soft-roe (milt)-producing organs are pressed out of the decapitation end and can be removed there through by an appropriate means or by falling out at this point. At the end of the passage through Sector I—I, the control rod 17 of the active pressing body 13 runs out onto a raised or cambered portion of the axial cam 18, through which this pressing body 13 is pushed out of its working position thus enabling its return above the advancing troughs 2.

The coordinating of the advancing speed of the troughs 2 with the speed of revolution of the rotational body 6 takes place in such a manner that with the respective entry of each trough 2 into the working area of the tool unit 5, a pressing body 13 stands available in the working position and follows a path 22 created as a result of the advancing movement of the troughs 2 and the revolving movement of the pressing bodies 13.

Depending on conditions, it can be advantageous to design the pressing bodies 13 as roller bodies, which can then be contoured in an appropriate manner.

What is claimed is:

1. An apparatus for processing decapitated fish having a tail end, a decapitation end, a belly including a belly cavity, a back and a longitudinal axis extending between the decapitation end and the tail end, for the purpose of gaining organs from the fish, in particular the gonads present in the belly cavity wherein the fish are conveyed for processing by conveying means having troughs defined by a trough bottom and provided with upstanding supporting webs, said trough receiving fish between the supporting webs with a fish side resting on the trough bottom, said conveying means including means for retaining the fish by engaging the fish tail area and said conveying means being further for conveying the fish in a conveying direction transverse to the longitudinal axis of the fish, comprising:

means for pressing a fish in said trough between said supporting webs including a pressing element for engaging the fish from a bottom side of the fish belly, and for progressively massaging the belly area from a tail-end part of the belly cavity toward a decapitation-end portion of the belly cavity;

means for controlling a movement of said pressing means to move said pressing element, at least while said pressing element engages said fish, along a plane that is essentially parallel to said trough bottom and slightly spaced from said trough bottom;

said pressing means including a rotational body supporting said pressing element and driven under control of said controlling means to rotate about an axis perpendicular to a plane defined by said trough bottom at a speed of rotation being synchronized with the speed of conveyance of said troughs; and said pressing element being mounted for resilient displacement in the direction of conveying.

2. An apparatus as claimed in claim 1, wherein the position of said axis is adjustable in the direction of said longitudinal axis.

3. An apparatus as claimed in claim 1, further comprising said pressing means having a carrier arm and said pressing element being mounted on a free end of said carrier arm, said carrier arm being mounted pivotably about a pivot axis perpendicular to a plane of rotation of said rotational body, and said carrier arm being mounted for resilient displacement against the force of a spring.

4. An apparatus as claimed in claim 2, further comprising said pressing means having a carrier arm and said pressing element being mounted on a free end of said carrier arm, said carrier arm being mounted pivotably about a pivot axis perpendicular to a plane of rotation of said rotational body, and said carrier arm being mounted for resilient displacement against the force of a spring.

5. An apparatus as claimed in claim 1, wherein said pressing means has means for moving said pressing element at least along part of its revolution with said rotation body out of a position perpendicular to a plane of rotation of said rotational body.

6. An apparatus as claimed in claim 2, wherein said pressing means has means for moving said pressing element at least along part of its revolution with said rotation body out of a position perpendicular to a plane of rotation of said rotational body.

7. An apparatus as claimed in claim 3, wherein said pressing means has means for moving said pressing element at least along part of its revolution with said rotation body out of a position perpendicular to a plane of rotation of said rotational body.

8. An apparatus as claimed in claim 4, wherein said pressing means has means for moving said pressing element at least along part of its revolution with said rotation body out of a position perpendicular to a plane of rotation of said rotational body.

9. An apparatus as claimed in claim 1, wherein said pressing element is a roller body.

10. An apparatus as claimed in claim 1, wherein said pressing element is a roller body.

11. An apparatus as claimed in claim 2, wherein said pressing element is a roller body.

12. An apparatus as claimed in claim 3, wherein said pressing element is a roller body.

13. An apparatus as claimed in claim 4, wherein said pressing element is a roller body.

14. An apparatus as claimed in claim 5, wherein said pressing element is a roller body.

15. An apparatus as claimed in claim 6, wherein said pressing element is a roller body.

16. An apparatus as claimed in claim 7, wherein said pressing element is a roller body.

17. An apparatus as claimed in claim 8, wherein said pressing element is a roller body.

18. An apparatus as claimed in claim 1, further comprising said pressing means having a bearing body and means for moving said bearing body upwardly and downwardly in synchronization with the rotation of said rotational body; and a carrier arm mounted at one end to said bearing body and having said pressing element mounted on its other end such that said pressing element is driven in rotation by said rotational body and moved downwardly into one of said troughs by said bearing body to engage a fish and then moved upwardly by said bearing body out of said one trough after progressively massaging the belly area of the fish from the tail end of the belly to the decapitation-end portion of the belly cavity.

* * * * *